United States Patent [19]

Hoos

[11] 4,159,818
[45] Jul. 3, 1979

[54] ROTARY VALVE TOP SEAL ASSEMBLY

[75] Inventor: Pieter F. Hoos, Royersford, Pa.

[73] Assignee: Walworth Company, Valley Forge, Pa.

[21] Appl. No.: 830,745

[22] Filed: Sep. 6, 1977

[51] Int. Cl.² .................................................. F16k 31/44
[52] U.S. Cl. .................................. 251/214; 277/190; 277/206 R
[58] Field of Search ............... 251/214, 309, 310, 311, 251/312, 316, 317; 277/190, 191, 206 R

[56] References Cited

U.S. PATENT DOCUMENTS

| 254,736 | 3/1882 | Van Tine | 277/206 R |
|---|---|---|---|
| 1,789,594 | 1/1931 | Oven | 277/206 R |
| 2,783,106 | 2/1957 | Barnhart | 277/206 R |
| 3,192,942 | 7/1965 | Manor et al. | 251/214 |
| 3,235,272 | 2/1966 | Smith | 251/214 |
| 3,371,676 | 3/1968 | Mullaney | 251/214 |
| 3,540,740 | 11/1970 | Smith | 251/214 |
| 3,552,716 | 1/1971 | Hoos | 251/317 |

FOREIGN PATENT DOCUMENTS

| 1132266 | 3/1957 | France | 277/206 R |
|---|---|---|---|
| 52815 | 8/1938 | Netherlands | 277/206 R |
| 214696 | 8/1967 | Sweden | 277/206 R |

*Primary Examiner*—Martin P. Schwadron
*Assistant Examiner*—G. L. Walton
*Attorney, Agent, or Firm*—Melvin R. Stidham

[57] ABSTRACT

In a rotary valve, such as a plug valve having a body cavity opening from the top, a top seal assembly includes a membrane of polytetrafluoroethelene or the like which extends over the cavity opening with its outer edges clamped between the valve body and a top closure. A groove around the opening accommodates cold flow of material from between the clamped surfaces beyond it. A circular opening in the membrane embraces and seals around the valve stem and an underturned lip around the opening engages against a generally horizontal sealing surface around the plug stem to be urged into sealing engagement by a load ring, providing a second, pressure augmented annular seal.

7 Claims, 6 Drawing Figures

ROTARY VALVE TOP SEAL ASSEMBLY

BACKGROUND OF THE INVENTION

This invention relates to a top seal for a rotary valve for services requiring a sealing member which is extremely stable and which provides an effective seal for a wide range of temperature, pressure and loading conditions. PTFE has been widely used as a material for this purpose. However, it has a tendency to cold flow under load. Valve components may be secured tightly in assembly to insure sealing, but at high temperatures the PTFE tends to soften and it tends to squeeze out from between such components, often leaving a void in the seal. In addition, because PTFE has a low degree of resiliency, it is difficult to provide an effective seal unless backed up by a pressure inducing member. In the case of sealing around the stem or other parts of a rotatable valve member, excessive clamping force will impede rotation of the valve member.

OBJECTS OF THE INVENTION

It is an object of this invention to provide a top seal for a rotary valve which provides an effective seal between body parts and around the stem of a rotatable valve member.

It is a further object of this invention to provide a top seal for a rotary valve which provides an effective seal around the top of the valve closure member without impeding its rotary, radial and/or axial movements.

It is a further object of this invention to provide a top seal for a rotary valve which may be clamped between a valve body and a valve closure member without impairing the integrity of the seal.

Other objects and advantages of this invention will become apparent from the description that follows, particularly when read in conjunction with the accompanying drawings.

BRIEF SUMMARY OF THE INVENTION

In carrying out this invention, there is provided a top seal in the form of a polytetrafluoroethelene (PTFE) membrane which extends across the top opening in a body cavity in which the valve closure member is installed. A valve closure member is bolted to the body to clamp the edges of the PTFE membrane. However, there is a recess or groove around the cavity opening and the body surface circumscribed by such groove is somewhat lower than that outside of the recess. Hence, the closure member may be tightly bolted and material will cold flow into the groove and, because the maximum clamping force occurs outside the ring of the recess, the integrity of the seal within the recess and within the area circumscribed by it, is ensured. A circular opening in the center of the membrane engages snugly around the stem to seal around it. In addition, there is a down-turned lip which is spaced slightly below the under surface of the membrane. A loading ring is movable axially of the stem and a gland ring above it is bolted to the body. Hence, when the loading ring is forced down by the gland ring it presses against the membrane around the central opening so that the down-turned lip is forced against the shoulder around the stem to provide a second annular seal. In addition, the down-turned lip of the membrane is curved so that internal pressure will tend to increase the radius of the curve to enhance sealing. A convex spherical surface is provided on the bottom of the gland ring to engage against a concave conical surface on the top of the loading ring whereby a downward force against the loading ring is asserted evenly around its circumference despite an unequal threading of the bolts in the gland ring.

DESCRIPTION OF PREFERRED EMBODIMENTS

Figure 1:
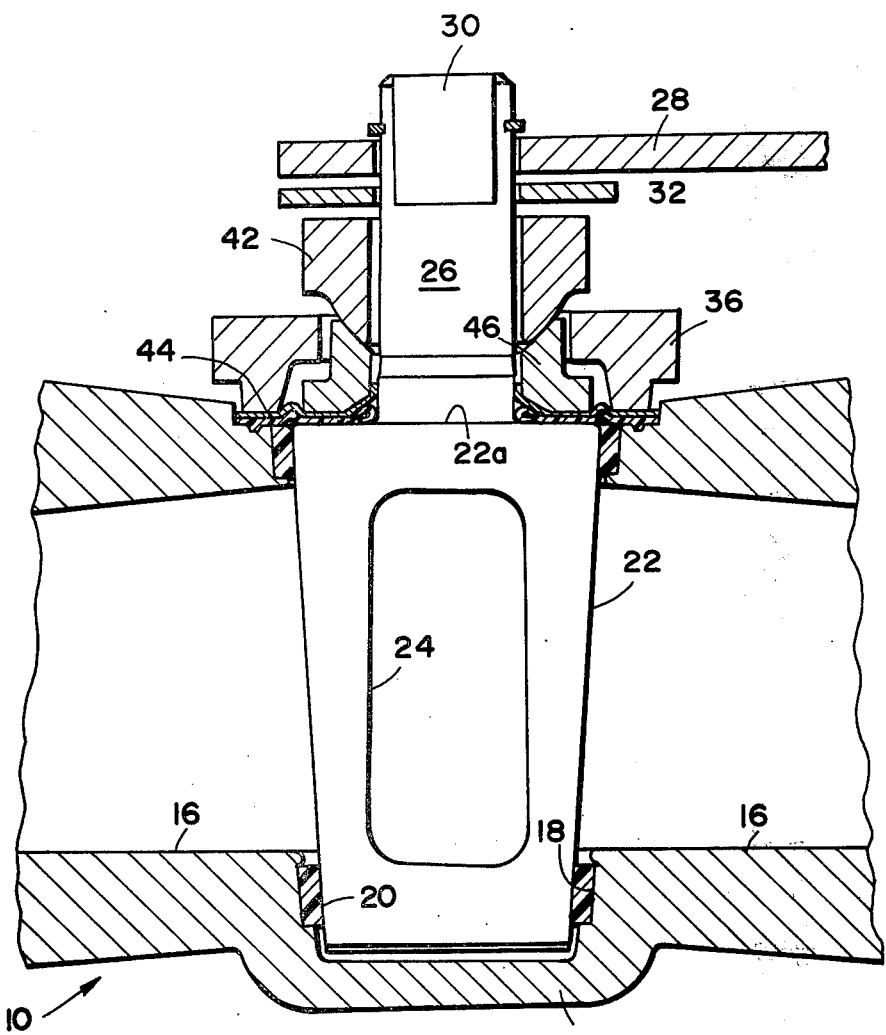
FIG. 1 is a vertical section view through a conical plug valve embodying features of this invention.
Figure 2:
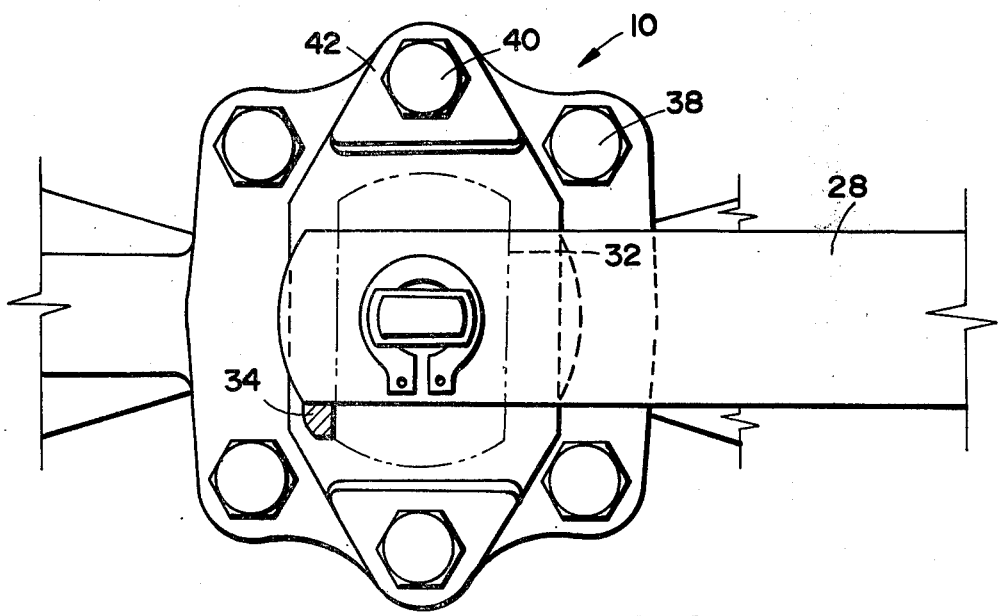
FIG. 2 is a top view of the valve.

Referring now to FIGS. 1 and 2 with greater particularity, there is shown a plug valve 10 including a valve body 12 with flow passages 16 and including suitable means, such as flanges or the like (not shown) for connection of the valve into a pipeline. The flow passages 16 open into a central frusto-conical cavity 18 on a vertical access. A frusto-conical liner or sleeve 20 is received in the body cavity to effect a seal and to facilitate rotation of the valve plug 22. For that purpose, the liner is of a material which is somewhat malleable or formable and which has a low coefficient of friction, such as polytetrafluorethylene (PTFE). The plug 22 is received in the liner 20 for 90° rotation from the closed position shown in FIG. 1 to an open position wherein the flow port 24 aligns with the body flow passages 16. A stem 26 which is keyed to or integral with the plug 22 may be rotated by means of a wrench 28 engaging a flat portion 30 of the stem with open and closed position of the valve being determined by an engagement of a stop bar 32, which is also keyed onto the stem 26, with a stop lug 34 (FIG. 2).

The plug 22 may be inserted into the open top of the conical cavity 18 and, when in place, the top is closed off by a top closure member 36 which is secured to the valve body 12, as by means of cap screws 38. Screws 40, also threaded to the valve body 12, bias a gland member 42 downward toward the plug member 22 to effect a top seal around a stem 26 by sealing engagement of the membrane 44, which is forced against the shoulder 22a of the plug 22, by means of a loading ring 46.

Figure 3:
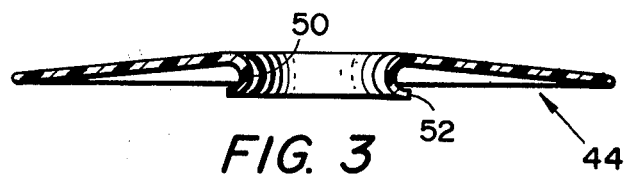
FIG. 3 is a section view of the top sealing membrane.
Figure 4:
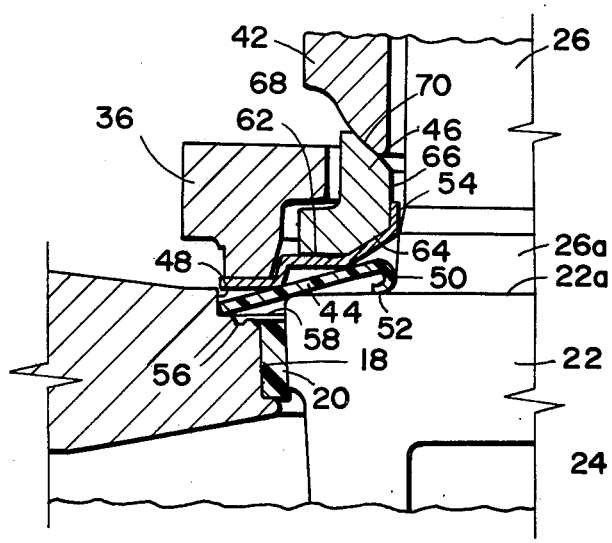
FIGS. 4 and 5 are partial section views of the membrane in stages of assembly.
Figure 5:
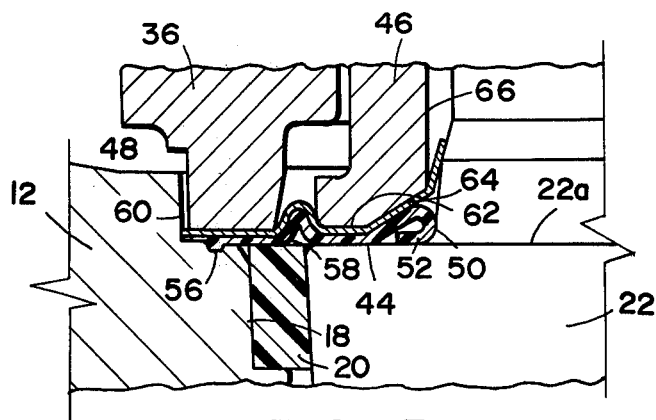

The Embodiment of FIGS. 3, 4 and 5

The membrane 44 may be preformed as shown of a suitable, stable slightly resilient but semi-rigid material, such as PTFE. The membrane has an outer periphery to conform generally to the shape of a depression 48 around the conical cavity, and preferably the depression 48 and the membrane 44 are circular. In any event, the membrane has a central opening 50 which is of a diameter to firmly engage and seal around a finished surface 26a of the stem 26. In addition, there is a downturned lip 52 which is spaced slightly below the undersurface of the membrane 44 to function in the nature of an annular, cantilever beam.

In installation, the membrane 44 is forced down around the stem 26 to provide the seal around the inner periphery 50, with the underturned lip 52 resting on the shoulder 22a of the valve plug 22. Then, a gasket backup plate with grounding fingers 54 of metal is placed over the stem 26 after which the top closure 36 is bolted snugly down to the position shown in FIG. 5. Surrounding the frusto-conical cavity 18 is a groove or recess 56 and the surface of the valve body 58 circumscribed by such recess 56 is finished to a lower level than the surface 60 surrounding the recess 56. Hence, when the closure member 36 is bolted down firmly, material from the PTFE membrane 44 may be sequeezed from above the surface 60 into the recess 56 to form a sort of interlock with the valve body 12. Since the maximum squeezing is against and limited by the higher surface 60, the membrane 44 overlying the recess 56 and the depressed surface 58 will not be penetrated whereby the integrity of the seal will be retained.

Finally, the gland ring or member 42 is bolted down to force the loading member 46 down to drive the plug 22 down into the body 12 and to deform the membrane 44 to the configuration shown in FIG. 5.

The loading ring 46 has a flat horizontal surface 62 and a sloping surface 64 tapering from the central opening 66. Hence, when the loading ring 46 is forced downward it will press the membrane 44 against the upper surface 22a of the plug and it will apply a moderate pressure against the membrane to deform the underturned lip 52, as shown, whereby it will apply a light annular spring pressure against the shoulder 22a. Moreover, internal pressure in the valve body 12 acting against the under surface of the membrane 44 tends to "straighten out" the underturned lip 52 to enhance the seal against the shoulder 22a. Thus, the membrane effects annular seals, both around the stem at the central opening 50 and against the shoulder under the downturned lip 52. Sealing, therefore, is effected under moderate force applied by the loading ring 46, and by internal pressure.

As shown most clearly in FIGS. 1 and 4, the gland member 42 has a convex spherical undersurface 68 which engages against a concave conical surface 70 on the loading ring 46. Hence, although the bolts 48 (FIG. 2) may not be evenly threaded into the valve body 12, the gland 42 will tend to rock on its spherical surface to maintain a continuous and constant force around the conical surface 70 and provide uniform sealing force around the loading ring 46.

Figure 6:
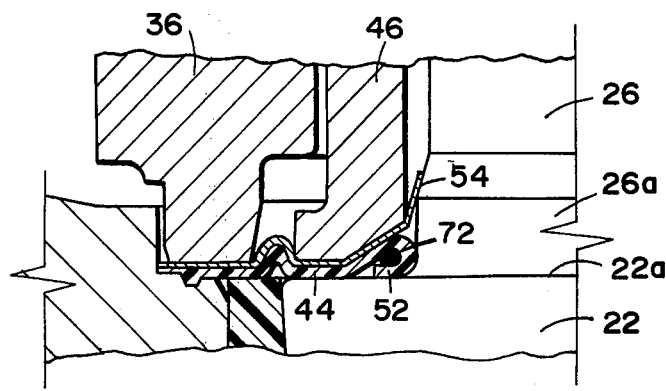
FIG. 6 is a large partial section view of another seal embodiment.

The Embodiment of FIG. 6

In this embodiment, an O-ring 72 may be placed under the downturned lip 52 to provide a resilient pressure member under the downturned lip 52 to augment the flexure of the material of the membrane 44 and ensure a resilient sealing pressure against the shoulder 22a of the plug 22.

While this invention has been described in conjunction with preferred embodiments thereof, it is obvious that modifications and changes therein may be made by those skilled in the art without departing from the spirit and scope of this invention, as defined by the claims appended hereto.

What is claimed as invention is:
1. In a rotary valve comprising:
 a valve body having flow passages therethrough;
 a cavity in said valve body opening from the top thereof;
 a top closure bolted to said valve body over said cavity;
 a valve closure member;
 a stem on said closure member rotatable in said top closures; and,
 a seal surface on said closure member around said stem and extending generally radially thereof;
 a top seal assembly for said valve comprising;
 a membrane of semi-rigid, distortable material extending over said cavity opening with outer portions thereof clamped between said valve body and said top closure;
 a generally circular opening in said membrane snugly receiving and sealing around said stem;
 an under-turned lip around said opening with an annular edge thereof engaging said seal surface;
 a loading ring around said stem mounted for movement therealong, the under surface of said loading ring being relieved around the inner diameter thereof overlying said lip; and
 means for forcing said loading ring downward to bias said lip against said seal surfaces.
2. The seal assembly defined by claim 1 wherein:
 said under-turned lip is spaced below overlying portions of said membrane to function as an annular axial cantilever spring.
3. The seal assembly defined by claim 1 wherein:
 the edge of said under-turned lip is of larger diameter than said circular opening so that internal pressure in said valve body biases said edge radially inward and downward to increase sealing force thereof.
4. The seal assembly defined by claim 1 wherein:
 the edge of said under-turned lip is of larger diameter than said circular opening; and including;
 a resilient ring around and above said under-turned lip to provide elastomeric support for said edge.
5. The seal assembly defined by claim 1 wherein the material of said membrane has cold flow characteristics under load; and including;
 an annular recess in said valve body around said cavity opening;
 said membrane outer portions when undistorted extending over said recess whereby material thereof cold-flows therein under bolting load.
6. The seal assembly defined by claim 5 wherein:
 the surface of said valve body around said cavity opening and circumscribed by said recess is slightly lower than the surface outside of said recess so that the surface of said valve body surrounding said recess limits squeezing of membrane material inward thereof.
7. The seal assembly defined by claim 1 wherein:
 the undersurface of said loading ring is tapered upward toward said inner diameter so that said loading ring is forced firmly against said membrane outward of said lip and moderately against said membrane above said lip to bias same lightly against said seal surface.

* * * * *